US012664828B2

(12) United States Patent
Sakhltkhutsishvili

(10) Patent No.: US 12,664,828 B2
(45) Date of Patent: Jun. 23, 2026

(54) SYSTEM FOR AND METHODS OF CALCULATING, PREDICTING, AND SIMULATING SAFETY SCORES FOR MOTOR CARRIERS

(71) Applicant: Demna Sakhltkhutsishvili, Hanover Park, IL (US)

(72) Inventor: Demna Sakhltkhutsishvili, Hanover Park, IL (US)

( * ) Notice: Subject to any disclaimer, the term of this patent is extended or adjusted under 35 U.S.C. 154(b) by 161 days.

(21) Appl. No.: 18/648,482

(22) Filed: Apr. 29, 2024

(65) Prior Publication Data

US 2025/0336243 A1 Oct. 30, 2025

(51) Int. Cl.

*G07C 5/00* (2006.01)
*G06Q 50/26* (2024.01)
*G07C 5/04* (2006.01)
*G07C 5/08* (2006.01)

(52) U.S. Cl.

CPC ........... *G07C 5/008* (2013.01); *G06Q 50/265* (2013.01); *G07C 5/04* (2013.01); *G07C 5/0825* (2013.01)

(58) Field of Classification Search

CPC ........ G07C 5/008; G07C 5/04; G07C 5/0825; G06Q 50/265
USPC ........................................................ 701/29.3
See application file for complete search history.

(56) References Cited

U.S. PATENT DOCUMENTS 10,311,749 B1 * 6/2019 Kypri ................... G09B 19/162
2014/0309844 A1 * 10/2014 Breed .................. G01G 19/024 702/175
2017/0017927 A1 * 1/2017 Domnick .............. B60W 40/04
2017/0263120 A1 * 9/2017 Durie, Jr. ............... G08G 1/205
2017/0344932 A1 * 11/2017 Ahmadi ............... G06Q 50/188
2025/0166106 A1 * 5/2025 Dobrovolska ......... G06Q 40/08

* cited by examiner

*Primary Examiner* — Tyler D Paige

(57) ABSTRACT

The system provides real-time safety scores for motor carriers, accurately predicts future safety scores, and allows users to simulate various safety scenarios. Users can input data and perform complex calculations, ensuring accurate and timely updates of safety scores. The system's efficiency lies in accumulating and analyzing extensive data, leading to more precise predictions of future safety scores. The calculated, predicted, or simulated safety scores are presented on diverse devices such as desktop computers, mobile phones, or other compatible devices.

24 Claims, 10 Drawing Sheets

SYSTEM FOR AND METHODS OF CALCULATING, PREDICTING, AND SIMULATING SAFETY SCORES FOR MOTOR CARRIERS

CROSS-REFERENCE TO RELATED APPLICATIONS

This patent application claims priority to U.S. Provisional Patent Application No. 63/499,213, filed on Apr. 29, 2023, entitled "System for and method of calculating, predicting, and simulating safety scores (measures and percentiles) for motor carriers". The disclosure of the prior application is considered part of and is incorporated by reference into this patent application.

FIELD

The utility patent application pertains to the field of transportation safety, focusing on motor carriers, with a specific emphasis on addressing challenges and enhancing capabilities related to the Compliance, Safety, and Accountability (CSA) program developed by the Federal Motor Carrier Safety Administration (FMCSA) of the U.S. Department of Transportation (DOT) aimed at improving large truck and bus safety on U.S. highways.

BACKGROUND

The invention responds to the need for improved safety management within the motor carrier industry, aligning with and enhancing the objectives of the CSA program established by the FMCSA. The CSA program collects data on carriers' safety performance from various sources, including inspections, accident reports, and compliance reviews. The CSA program's Safety Measurement System (SMS) uses the collected data to calculate safety scores for various safety categories (e.g., unsafe driving, hours-of-service compliance, vehicle maintenance, etc). It allows carriers to monitor their performance. Carriers with scores over established thresholds may be subject to interventions such as warning letters from FMCSA, roadside inspections, investigations, or compliance reviews. These interventions aim to improve safety practices and reduce the risk of crashes. CSA safety scores can also be used by shippers, freight brokers, or insurance companies to gauge the safety performance of a motor carrier. CSA safety scores are calculated monthly based on a snapshot of the historical records from the SMS database taken two weeks before publishing the generated scores. While the CSA program has been instrumental in assessing and improving safety performance, the proposed system augments its effectiveness by providing real-time calculations, predictive insights, and simulation capabilities for motor carriers.

SUMMARY

A system designed to seamlessly integrate with the CSA program, offering real-time safety score calculations, accurate predictions, and interactive simulations for motor carriers. This innovation enhances the capabilities of the CSA program, providing a more dynamic and proactive approach to safety management.

DETAILED DESCRIPTION

Figure 1:
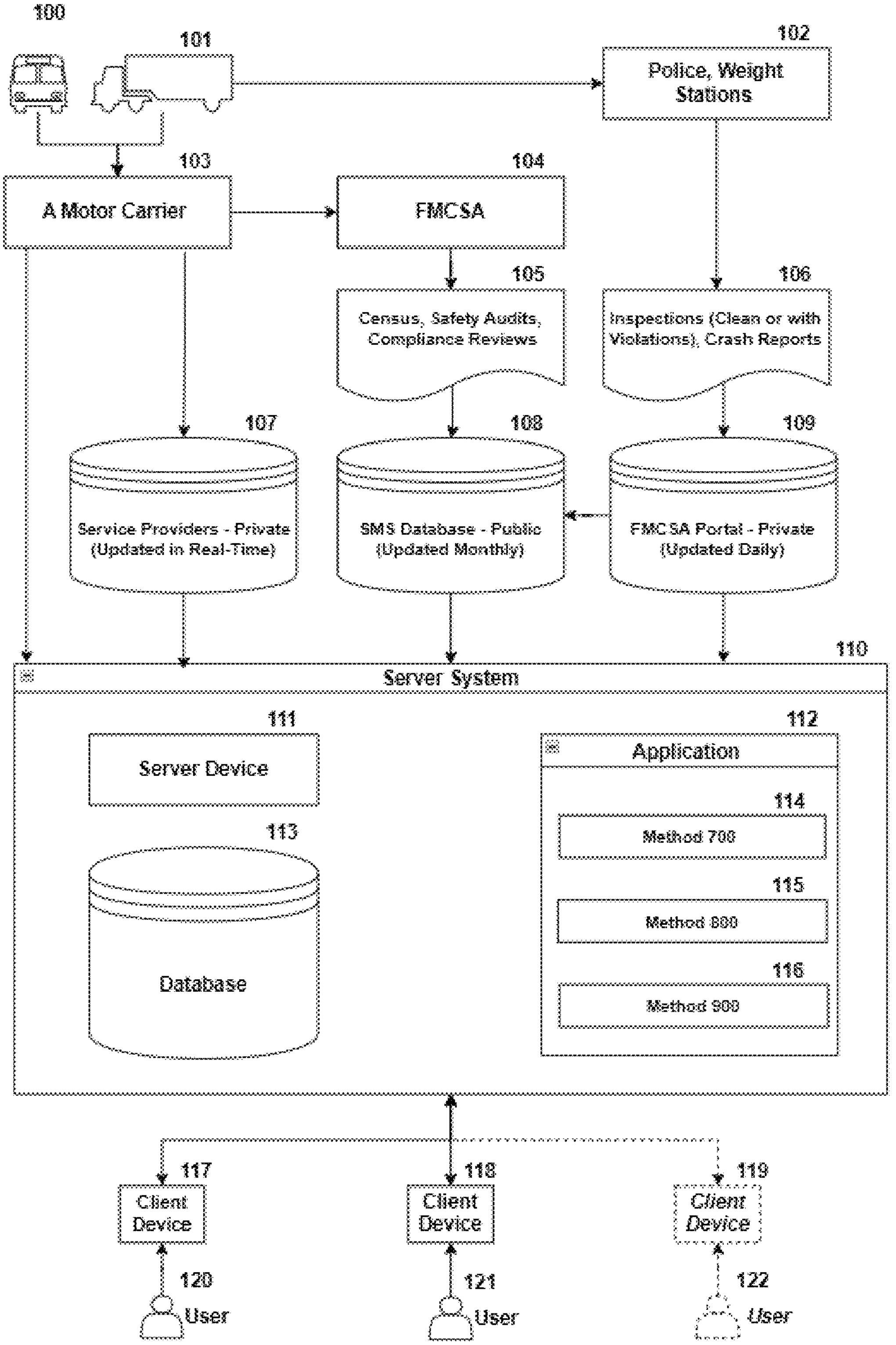
FIG. 1 depicts an environment in accordance with examples of the present disclosure.

FIG. 1 illustrates a block diagram of a network environment 100, which may be used in some implementations described herein. In some implementations, the network environment 100 includes one or more server systems, e.g., server system 110

The server system 110 may communicate through a network with client devices 117, 118, and 119, where users 120, 121, and 122 can view information and provide inputs for calculating safety scores.

Figure 7:
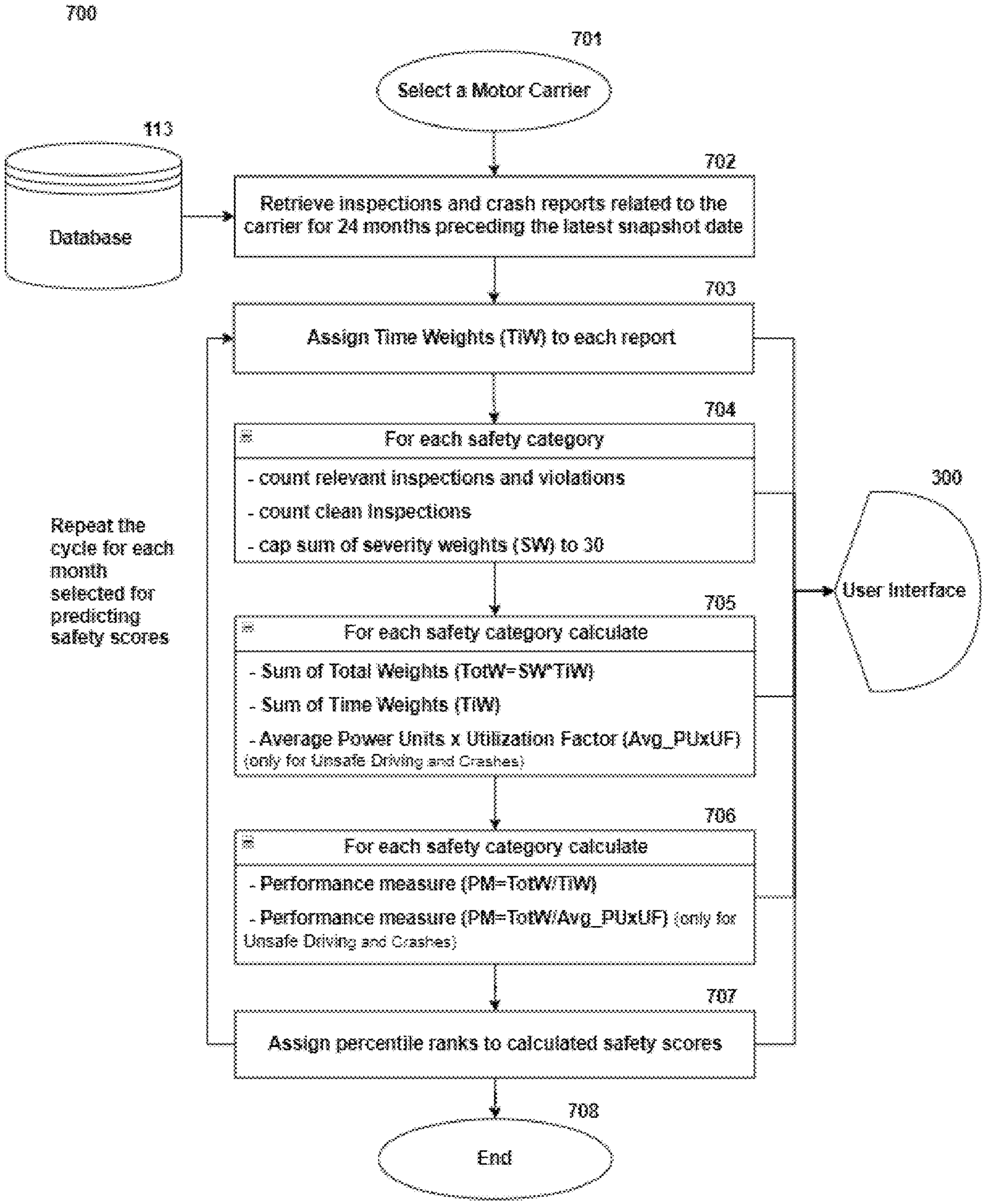
FIG. 7 depicts a primary method for generating safety scores by the example of the first implementation of the present disclosure.
Figure 8:
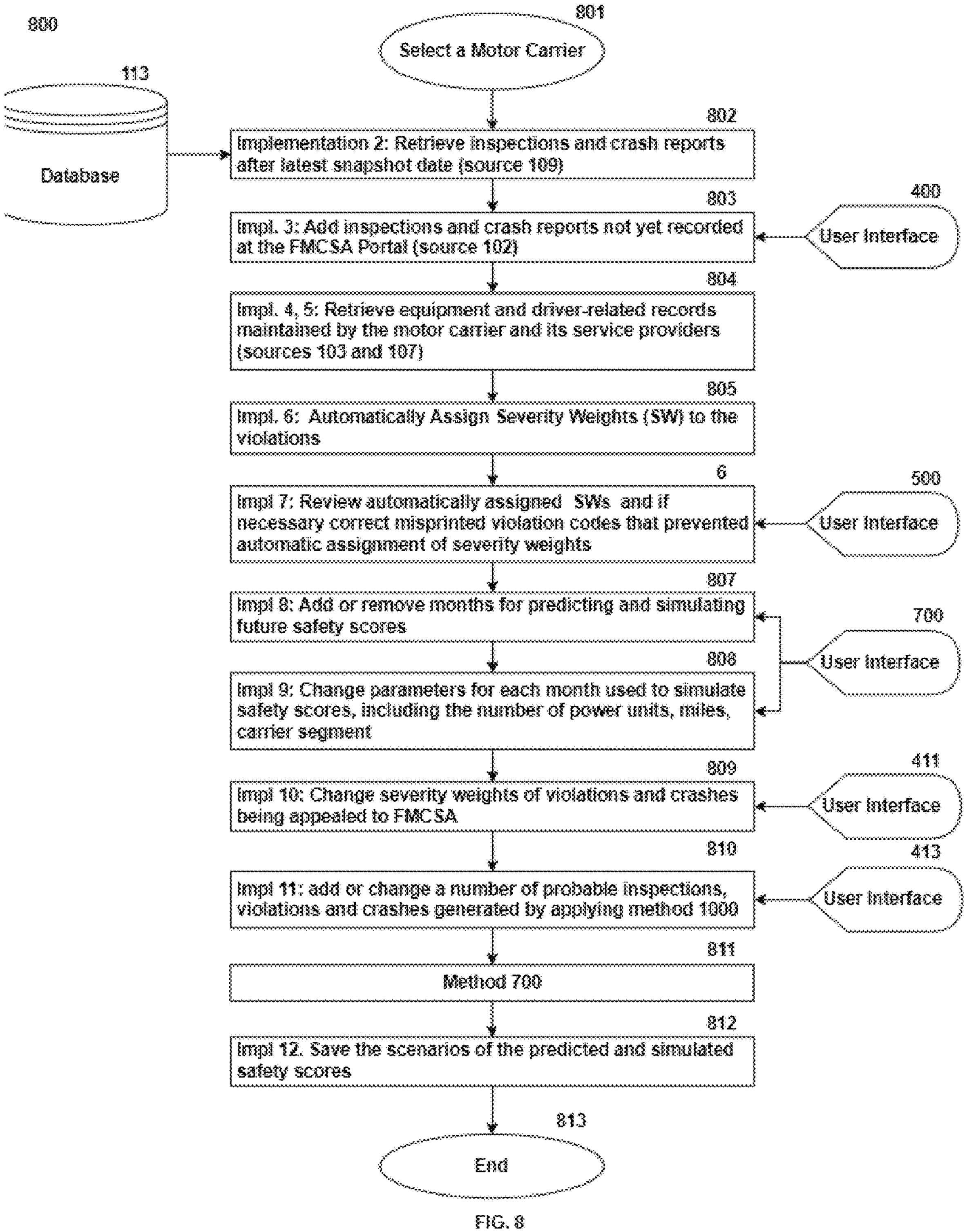
FIG. 8 depicts a method for generating safety scores in accordance with the examples of all twelve implementations of the present disclosure combined.
Figure 9:
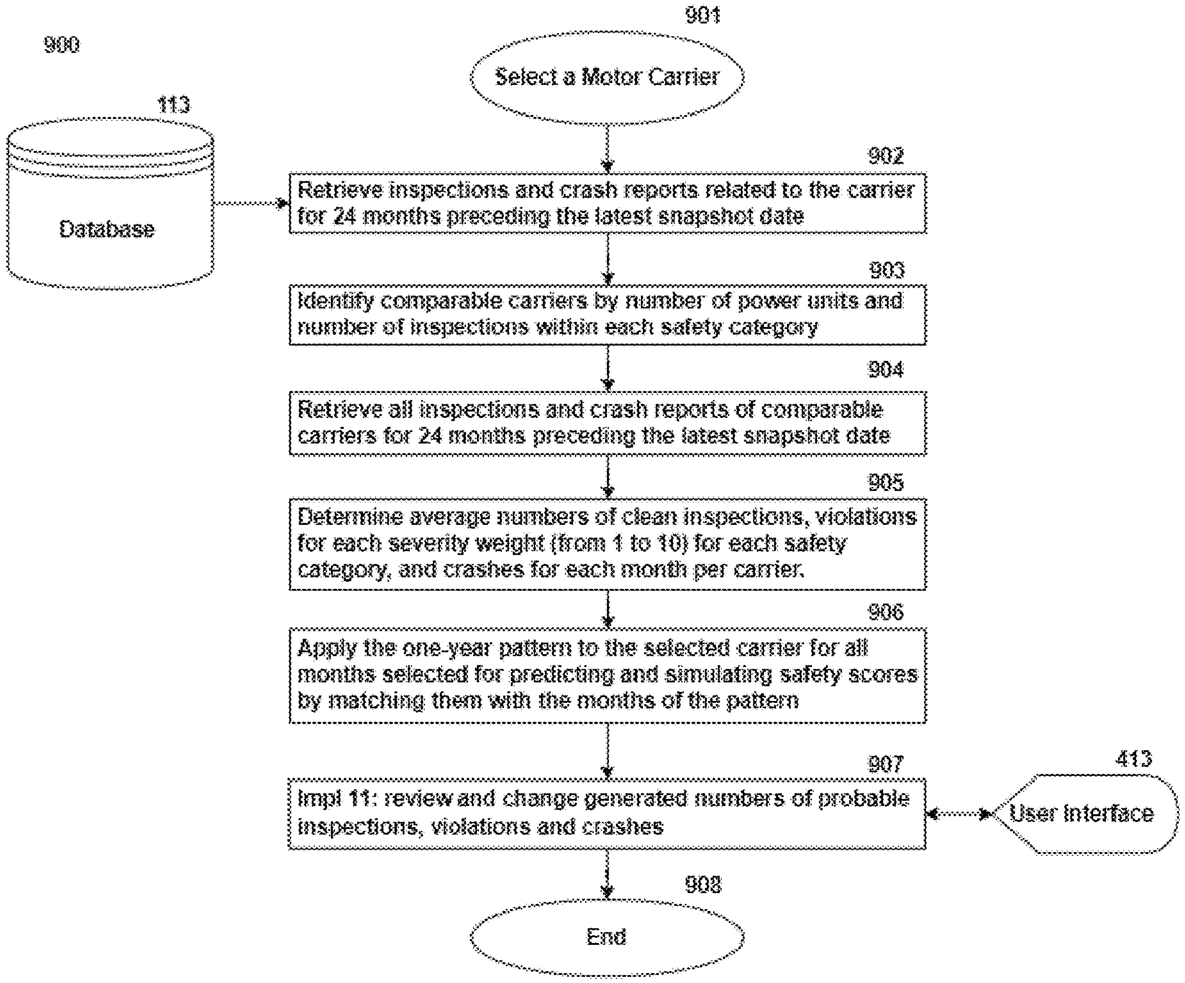
FIG. 9 depicts a method for generating numbers of probable inspections, violations, and crashes for each month of prediction or simulation.

The client devices 117, 118, and 119 can be any computing device (e.g., desktop, laptop computer, tablet computer, cell phone, smartphone, etc.) that can execute a standalone program, a program on a web browser, or a mobile application to run one or more methods described herein (e.g., FIGS. 7, 8, 9). Although FIG. 1 shows three client devices, any number of devices may be supported.

The server system 110 may also communicate through a network with external information systems 103, 107, 108, and 109. The external information systems can include one or more of, but are not limited to, information systems used by motor carriers 103, their service providers 107, FMCSA SMS Database 108, and FMCSA Portal 109.

The server system 110 can include any hardware, software, or hardware and software operable to process data received from one or more sources of external data 103, 107, 108, 109 and to provide the information to the users 120, 121, 122. The server system may include one or more server devices 111 that may be provided in a cloud computing environment to run a variety of server applications to receive data from sources of external data 103, 107, 108, 109, to process the received data, and to process requests for web pages, web services, or other electronic data from the client devices 117, 118, 119. The server applications may include HTTP(s), FTP, Java, database servers, etc.

The server system may store the data received from the sources of external data 103, 107, 108, 109 or user inputs from the client devices 117, 118, 119 in one or more databases 113. The user-provided inputs may include any data starting from the inspection and accident reports not yet registered at the FMCSA Portal 109 for calculating current safety scores, ending with potential violations, traffic accidents and inspections without violations, and outcomes of appealing violations to FMCSA 104 to predict future safety scores and simulate various scenarios. There may be other sources of external data not shown in FIG. 1.

Information systems used by motor carriers 103 and their vendors 107 can provide data about equipment 101 and drivers, driving events, driver training, equipment 101 breakdowns, repairs and maintenance, inspections, and accident reports not yet registered at the FMCSA Portal 109 by police and weight stations 102. Safety Measurement System (SMS) Database 108 can provide census data of motor carriers, results of safety audits and compliance reviews 105 conducted by FMCSA 104, historical records of all inspections, violations, and traffic accidents 106, and historical safety scores.

SMS database 108 is updated, and safety scores are generated by FMCSA for each motor carrier monthly after two weeks of taking a snapshot of all inspections and traffic accidents at a predefined snapshot date. So, at any given moment, published safety scores are from two to six weeks old. FMCSA Portal 109 is updated daily and can provide up-to-date inspection reports (with and without violations) and crash reports 106 for calculating the safety scores in real-time.

Each source of external data 103, 107, 108, 109 may have one or more ways for providing the data to the server system 110 (e.g., connection protocols for retrieving electronic data directly from the databases of each source, web services, file servers, application programming interfaces (API), user interfaces for downloading the data, etc.).

It should be noted that while FIG. 1 shows example blocks of process 100, in some implementations, process 100 may include additional blocks, fewer blocks, different blocks, or differently arranged blocks than those depicted in FIG. 1. Alternatively, two or more of the blocks of process 100 may be performed in parallel.

Process 100 may include additional implementations, such as any single implementation or combinations of implementations described below and in connection with one or more other processes described here.

Figure 2:
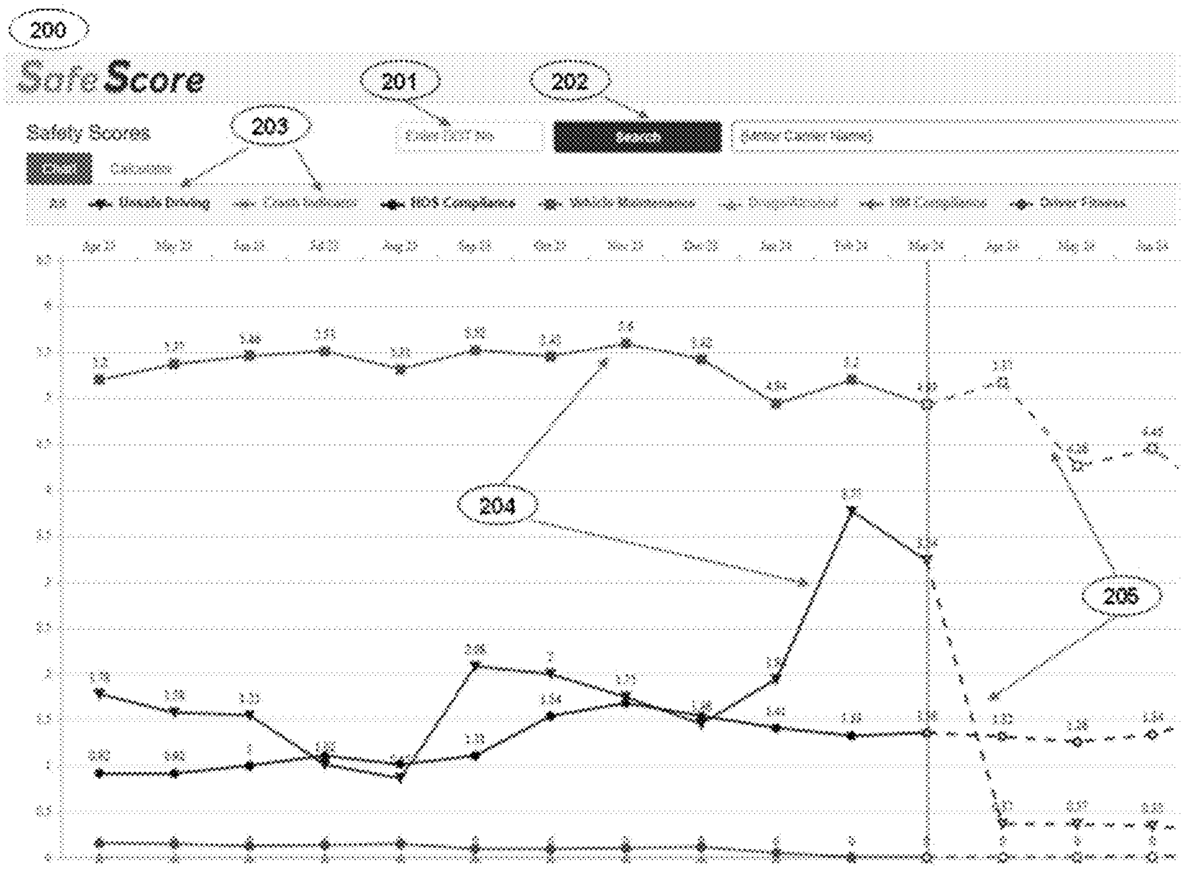
FIG. 2 depicts a graphical user interface for providing safety scores and components of their computation in accordance with examples of the present disclosure.

In a first implementation, a first source of one or more electronic sources is the FMCSA SMS database 108 containing public records for motor carriers. For example, as illustrated in FIG. 2, a user may use the graphical element 201 to enter the DOT No of a motor carrier 201 and click the button 202 to display a chart of historic 204 and predicted 205 safety measures (safety scores that measure a carrier's performance in a particular safety category) based on the data received from FMCSA SMS Database 108. The received data can be from two to six weeks old. Still, the graphical elements illustrated in FIG. 2 allow users to quickly understand the current and predicted trends in each safety category before proceeding to a more detailed analysis of a particular safety category.

Figure 3A:
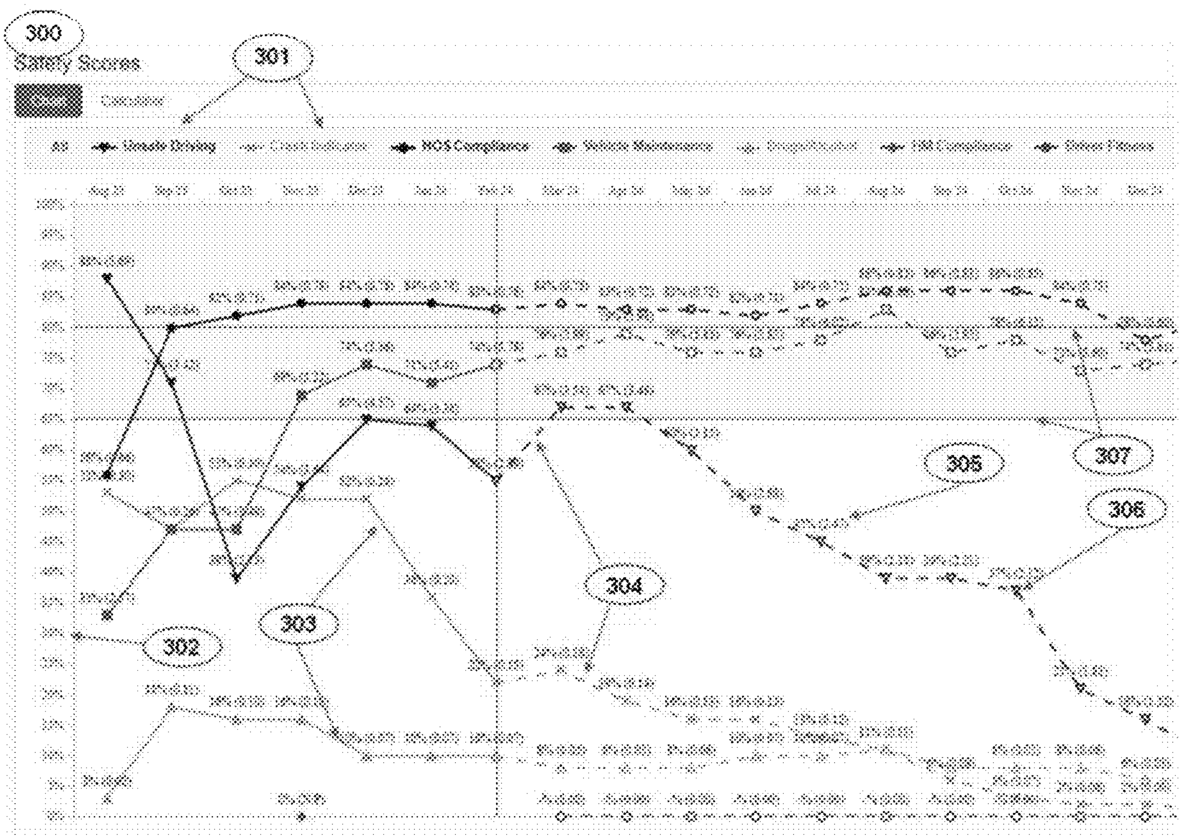
FIG. 3A also depicts a graphical user interface for providing safety scores and components of their computation in accordance with examples of the present disclosure.
Figure 3B:
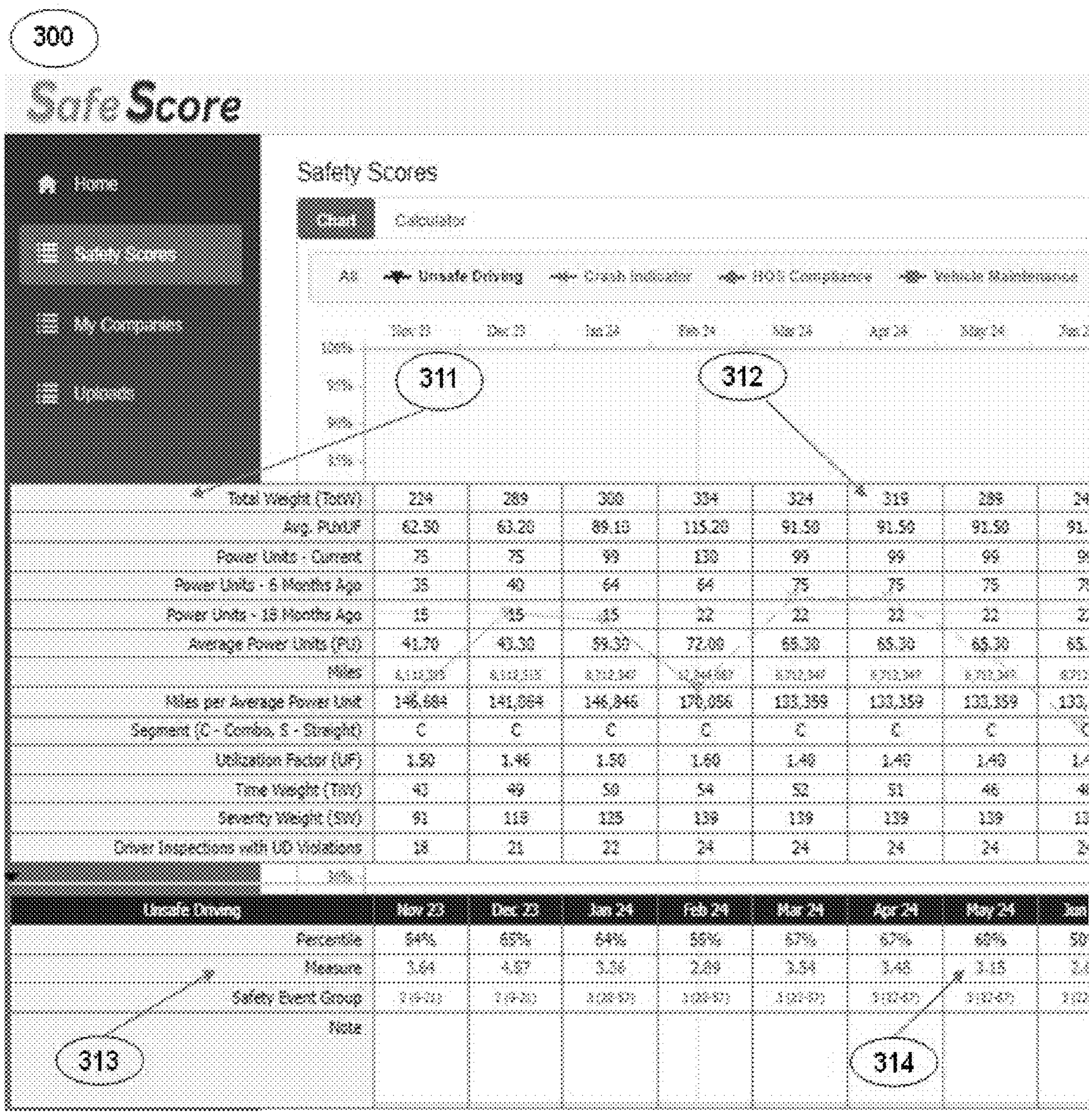
FIG. 3B also depicts a graphical user interface for providing safety scores and components of their computation in accordance with examples of the present disclosure.

Alternatively, FIGS. 3A and 3B illustrate graphical elements where a user can see a chart of historic 303 and predicted 304 safety scores, including percentile ranks 302 (a carrier's safety posture relative to other carriers with similar numbers of relevant inspections) and safety measures 305. Graphical element 307 allows a user to see safety measures crossing predefined thresholds. Also, in both cases, a user may click names of the safety categories 203 and 301 to display or hide the safety measures and percentile ranks in the clicked category, separately or in combination with other categories. While focusing on one safety category, a user may click a point on the chart (e.g., 306) to display the breakdown of the calculation 313 for each period, as illustrated in FIG. 3B. By further clicking on measure 314, additional details of calculation 311 can be displayed, and so on, up to the granular level of displaying all violations or inspections without violations contributing to the safety score (e.g., further by clicking Total Weight 312).

Figure 4:
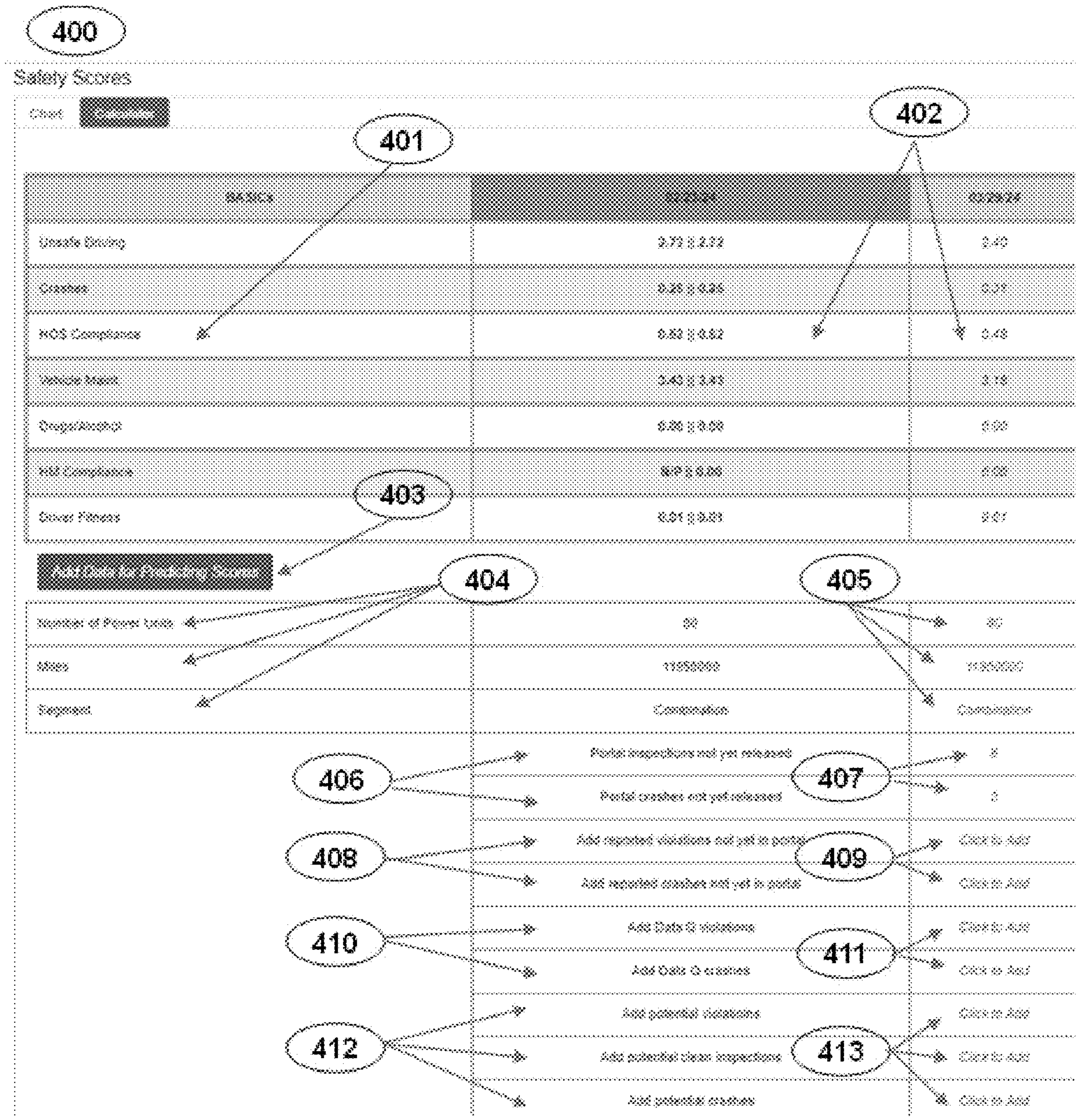
FIG. 4 depicts a graphical user interface for viewing inspections, and crash reports received from the FMCSA Portal not yet released to the FMCSA SMS database and adding data from nonelectronic sources.

In a second implementation, alone or in combination with the first implementation, a second source of one or more electronic is FMCSA Portal 109, containing up-to-date private records, including inspections, violations, and crashes not yet released to the FMCSA SMS database 108. FIG. 4 illustrates graphical elements where a user can view inspections and crash reports from FMCSA Portal not yet released to the FMCSA SMS database 108 by clicking numbers 407 in the rows "Portal inspections not yet released" 406 and "Portal crashes not yet released" 406.

In a third implementation, alone or in combination with the first and second implementations, a third source of one or more electronic sources is a collection of inspections, violations, and crashes reported to a motor carrier but not yet recorded at the FMCSA Portal 109 by police and weight stations 102. FIG. 4 illustrates graphical elements where a user can add inspections and crash reports not yet recorded at the FMCSA Portal 109 by police and weight stations 102 by clicking "Click to Add" 409 (or by clicking numbers of already added reports) next to "Add reported violations not yet in portal" 408 and "Portal crashes not yet in portal" 408.

In a fourth implementation, alone or in combination with one or more of the first through third implementations, a fourth source of one or more electronic sources is a collection of electronic records maintained by motor carriers 103 concerning their drivers and equipment.

In a fifth implementation, alone or in combination with one or more of the first through fourth implementations, a fifth source of one or more electronic sources is a collection of electronic records maintained by service providers 107 to motor carriers 103 concerning their drivers and equipment.

A sixth implementation, alone or in combination with one or more of the first through fifth implementations, process 100 may include automatic assignment of severity and time weights to the violations received from FMCSA Portal 109 using violation codes assigned by police and weight stations in inspection reports.

Figure 5:
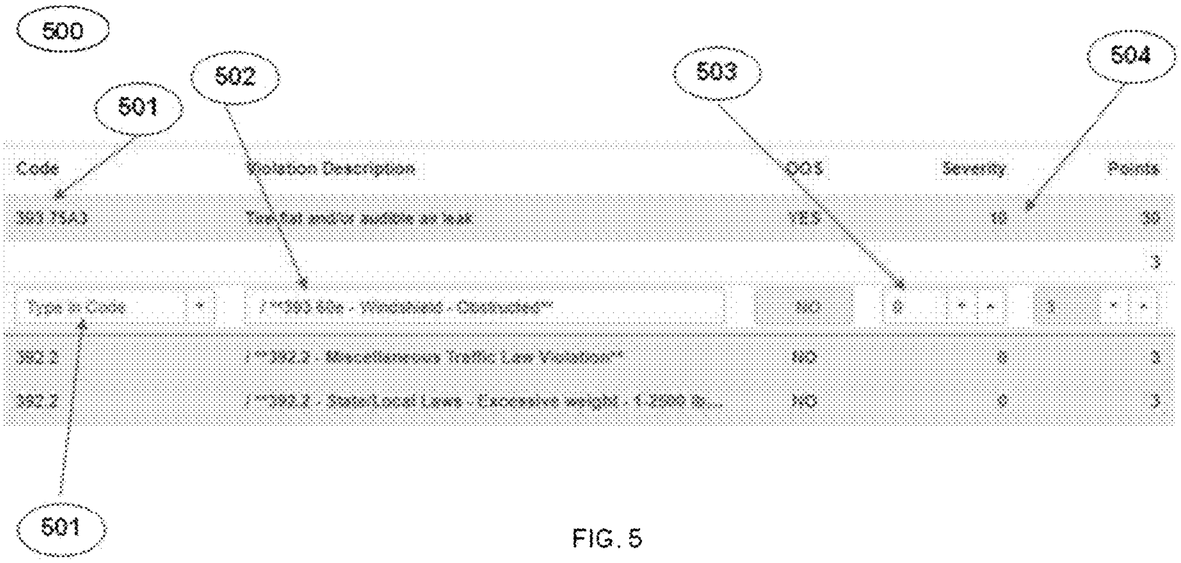
FIG. 5 depicts a graphical user interface for reviewing automatically assigned severity codes and editing the misprinted violation codes.

In a seventh implementation, alone or in combination with one or more of the first through sixth implementations, the user interface may include graphical elements allowing a user to review and edit automatically assigned severity and time weights to the violations and to correct codes of violation misprinted by the police and weight stations 102 that prevent automatic assignment of the severity and time weights. FIG. 4 illustrates a graphical element 500 (FIG. 5) may be opened by clicking numbers in the rows "Portal inspections not yet released" 406, where a user can review automatically assigned severity codes 504 and edit a misprinted code 502 by typing it in 501 and populating a list of identical codes to find a correct match by the description of the violation 502 in the report.

The seventh implementation, combined with the first through sixth implementations, allows the most up-to-date calculations of the safety scores.

Additional implementations, any single implementation, or any combination of implementations described below, allow users to simulate various scenarios to choose particular courses of action for improving safety and monitoring actual safety scores against simulated ones.

In an eighth implementation, alone or in combination with one or more of the first through seventh implementations, the user interface may include graphical elements allowing users to add or remove months for predicting and simulating future safety scores. Users may access the graphical elements by clicking "Add Data for Predicting Scores" 403.

Figure 6:
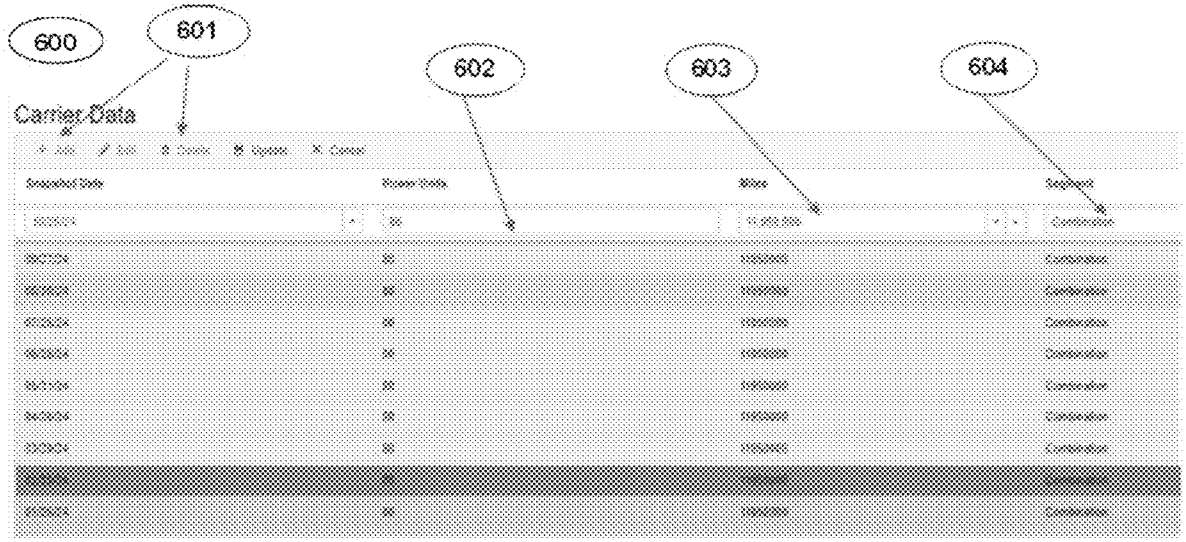
FIG. 6 depicts a graphical user interface for adding or removing months for predicting and simulating future safety scores and changing other parameters of computation.

For example, as illustrated in FIG. 6, users may add or remove future months by clicking "Add" or "Delete" toolbar item 601 in the graphical element 600.

In a ninth implementation, alone or in combination with one or more of the first through eighth implementations, the user interface may include graphical elements allowing a user to change parameters for each month to simulate safety scores, including the number of power units, miles, and carrier segment. Users may access the graphical elements (FIG. 6) by clicking "Add Data for Predicting Scores" 403. For example, as illustrated in FIG. 6, a user may add or edit quantity of power units, miles, and carrier segments in the respective fields 602, 603, and 604 of the graphical element 600.

In a tenth implementation, alone or in combination with one or more of the first through ninth implementations, the user interface may include graphical elements allowing a user to change severity weights of violations and crashes being appealed to FMCSA to simulate the effects of the appeal outcomes on the safety scores. A user may access the graphical elements by clicking "Click to Add" 411 (or by clicking numbers of already added reports) at "Add Data Q violations" 410 and "Add Data Q crashes" 410.

In an eleventh implementation, alone or in combination with one or more of the first through tenth implementations, the user interface may include graphical elements allowing users to add or change numbers of probable inspections, violations, and crashes generated by the prediction module. Users may access the graphical elements by clicking "Click to Add" 413 (or by clicking numbers already added reports) at "Add potential violations" 412, "Add potential clean inspections" 412, and "Add potential crashes" 412.

In a twelfth implementation, alone or in combination with one or more of the first through eleventh implementations, the user interface may include graphical elements allowing a user to calculate and save multiple scenarios of the predicted and simulated safety scores for the same motor carrier independently from other users to be retrieved later and compared to actual safety scores.

FIG. 7 shows a primary method 700 for making historical, current, and predicted policy scores available to one or more users in all examples of the implementations of the present disclosure. The method is a general order for the steps of method 700, shown in FIG. 7. Method 700 may include more or fewer steps or arrange the order of the steps differently than those shown in FIG. 7. Method 700 can be executed as a set of computer-executable instructions executed by a computer system and encoded or stored on a computer-readable medium. From now on, method 700 shall be explained concerning the systems, components, devices, modules, data structures, interfaces, methods, etc., described in conjunction with FIGS. 1-7.

For example, in the first implementation, the method may begin at 701 after entering the DOT No of a motor carrier 201 and clicking the button 202, where inspections and crash reports received from SMS Database 108 for to the selected carrier for 24 months preceding the latest snapshot date 702 will be retrieved from the database 113 and steps from 703 through 708 processed for each month selected for predicting the safety scores. A user can view the outputs of each step by clicking respective graphical elements in the user interface 300.

Each implementation in the present disclosure uses the same primary method 700 but may add additional steps at the beginning or the end of method 700, depending on the type of the received data and the combination of the implementations. While these additional steps can be described separately for each implementation, FIG. 8 depicts examples of additional steps that may be added before or after method 700 for generating safety scores, assuming that all twelve implementations are combined.

FIG. 9 illustrates an additional method 900 for predicting the numbers of probable inspections, violations, and crashes for each month of prediction or simulation based on the history of the selected carrier and average numbers for each month of the population of other carriers comparable by quantity of power units and inspections.

The invention claimed is:

1. A computer-implemented method executed by one or more processors of a network-connected server system, the method comprising: (a) retrieving, via an authenticated network session, a first dataset consisting of inspection and crash records for a selected motor carrier from an FMCSA Safety Measurement System (SMS) database corresponding to a published snapshot date; (b) retrieving, via an authenticated network session, a second dataset consisting of inspection and crash records for the same motor carrier from an FMCSA Portal, the second dataset including records dated after the snapshot date and not yet released to the SMS database; (c) normalizing the first and second datasets into a canonical violation record format and de-duplicating records based on report identifiers and state/date combinations; (d) for each violation record, automatically assigning severity and time weights by mapping a recorded violation code to an FMCSA codebook; (e) when a violation code in a record is inconsistent with a natural-language violation description in the same record, automatically correcting the violation code by selecting-using a string-similarity match to the codebook exceeding a threshold-a corrected code and assigning corresponding severity and time weights; (f) computing, for each safety category, a current safety measure in accordance with the FMCSA SMS methodology using the assigned severity/time weights and an exposure measure, and computing a percentile rank for the carrier relative to a peer group defined by power units and inspection count; (g) predicting safety measures and percentile ranks for a plurality of future months by estimating numbers of clean inspections, violations by severity, and crashes using the carrier's history combined with peer-group monthly averages, and recomputing the safety scores for each future month; (h) detecting whether a current or predicted percentile rank crosses a predefined threshold and, in response, generating an alert and causing display of a drill-down breakdown of the computations in an interactive user interface; and (i) storing the normalized datasets and computed values in a non-transitory computer-readable medium.

2. The method of claim 1, wherein a first source of the one or more electronic sources is the FMCSA SMS database containing public records for motor carriers.

3. The method of claim 1, wherein a second source of the one or more electronic sources is the FMCSA Portal containing private records for motor carriers.

4. The method of claim 1, wherein a third source of the one or more electronic sources is police and weight stations sending inspection reports to motor carriers, including inspections, violations, and crashes reported to a motor carrier but not yet recorded at the FMCSA Portal by police and weight stations.

5. The method of claim 1, wherein a fourth source of the one or more electronic sources is data maintained by motor carriers.

6. The method of claim 1, wherein a fifth source of the one or more electronic sources is data maintained by service providers to motor carriers.

7. The method of claim 1, wherein a first methodology of the one or more methodologies for calculating safety scores is the Safety Measurement System (SMS) Methodology as published and updated from time to time by FMCSA.

8. The method of claim 1, wherein a second methodology of the one or more methodologies for calculating safety scores is the Driver Safety Measurement System (DSMS) Methodology as published and updated from time to time by FMCSA.

9. The method of claim 1, wherein a third methodology of the one or more methodologies for calculating safety scores is the Inspection Selection System (ISS) for Compliance Safety Accountability (CSA) Algorithm as published and updated from time to time by FMCSA.

10. The method of claim 1, wherein the computing the safety scores further comprises an automatic assignment of severity weights to violations received from the FMCSA Portal based on violation codes recorded by police officers in inspection reports.

11. The method of claim 1, wherein the user interface further comprises graphical elements allowing users to review and edit automatically assigned severity weights to violations and to correct codes of violations misprinted by police officers that prevent automatic assignment of the weights.

12. The method of claim 1, wherein the user interface further comprises graphical elements allowing users to enter data from nonelectronic sources manually.

13. The method of claim 1, wherein the user interface further comprises graphical elements allowing users to add and remove months for predicting and simulating future safety scores.

14. The method of claim 1, wherein the user interface further comprises graphical elements allowing users to review and change parameters used to compute predicted safety scores, including quantity of power units, miles, and carrier segments for prediction and simulation months.

15. The method of claim 1, wherein the user interface further comprises graphical elements allowing a user to change severity weights of violations and crashes being appealed to FMCSA to simulate their effects on the safety scores.

16. The method of claim 1 further comprises predicting numbers of probable inspections, violations, and crashes for months of a period to be predicted and simulated based on average monthly numbers of inspection reports with no violations, violations with different severity weights in safety categories, and crashes per carrier among carriers having the same number of power units and inspections within each safety category.

17. The method of claim 1, wherein the user interface further comprises graphical elements allowing a user to change quantities of predicted inspections, violations, and crashes, their distribution over time, and severity weights.

18. The method of claim 1, wherein the user interface further comprises graphical elements allowing a user to calculate and save multiple scenarios of the predicted and simulated safety scores for the same motor carrier independently from other users.

19. A non-transitory computer-readable medium storing instructions that, when executed by one or more processors, cause performance of the method of claim 1.

20. The method of claim 1, wherein the string-similarity match comprises computing an edit-distance between the violation description and codebook entries and selecting the lowest-distance entry above a confidence threshold, and presenting the proposed correction for operator confirmation in the user interface.

21. The method of claim 1, wherein the peer group is determined by both (i) quantity of power units and (ii) number of relevant inspections in the category, and the percentile computation excludes months lacking exposure.

22. The method of claim 1, further comprising applying hysteresis to the threshold detection to avoid repeated alerts due to minor fluctuations.

23. The method of claim 1, wherein predicting the future counts uses a Poisson or seasonal average model blended with peer-group monthly averages.

24. The method of claim 1, wherein the user interface permits saving multiple scenarios per carrier and later comparing each scenario to actual scores as they are recomputed from Portal data.

* * * * *